United States Patent
Hibino et al.

(10) Patent No.: US 9,777,619 B2
(45) Date of Patent: Oct. 3, 2017

(54) SHIP ENGINE

(71) Applicants: Yanmar Co., Ltd., Osaka-shi (JP); FEV Gmbh, Aachen (DE)

(72) Inventors: Mitsuhiro Hibino, Osaka (JP); Kazuki Maetani, Osaka (JP); Frank Haubner, Aachen (DE); Jeroen Slotman, Aachen (DE); Moritz Baehr, Aachen (DE)

(73) Assignees: Yanmar Co., Ltd., Osaka (JP); FEV GMBH, Aachen (DE)

( * ) Notice: Subject to any disclaimer, the term of this patent is extended or adjusted under 35 U.S.C. 154(b) by 412 days.

(21) Appl. No.: 14/373,333

(22) PCT Filed: Jan. 11, 2013

(86) PCT No.: PCT/JP2013/000093
§ 371 (c)(1),
(2) Date: Jul. 18, 2014

(87) PCT Pub. No.: WO2013/108603
PCT Pub. Date: Jul. 25, 2013

(65) Prior Publication Data
US 2014/0369863 A1 Dec. 18, 2014

(30) Foreign Application Priority Data

Jan. 20, 2012 (JP) .................. 2012/010526
Oct. 25, 2012 (JP) .................. 2012/235989

(51) Int. Cl.
*F02B 29/04* (2006.01)
*F02B 37/013* (2006.01)
(Continued)

(52) U.S. Cl.
CPC .......... *F02B 29/0412* (2013.01); *F01D 25/12* (2013.01); *F02B 37/004* (2013.01);
(Continued)

(58) Field of Classification Search
CPC ......... F05D 2260/211; F05D 2250/312; F05D 2250/313; F02B 29/04; F02B 29/0412;
(Continued)

(56) References Cited

U.S. PATENT DOCUMENTS

2008/0295515 A1* 12/2008 Wegner ............... F02B 29/0412
60/605.2
2009/0211244 A1* 8/2009 Wegner ............... F02B 29/0412
60/599

FOREIGN PATENT DOCUMENTS

FI  WO 2010076383 A1 * 7/2010 ............... F01M 1/02
JP  47-43608 A   12/1972
(Continued)

OTHER PUBLICATIONS

Autozine Technical School Webpage Publication—Twincharger_LayoutWebpage_Autozine_1997-2011.pdf).*

Primary Examiner — Charles Freay
Assistant Examiner — Kenneth J Hansen
(74) Attorney, Agent, or Firm — Sterne, Kessler, Goldstein & Fox P.L.L.C.

(57) ABSTRACT

A ship engine includes a first turbocharger, a first intercooler, a second turbocharger, and a second intercooler. The first turbocharger is arranged at one end of the ship engine with respect to a crank axis direction. The first intercooler and the second turbocharger are arranged in an end portion of the ship engine with respect to a device width direction. The first intercooler and the second turbocharger are arranged side by side in the crank axis direction. The second intercooler is arranged at the other end (at the side opposite to the side where the first turbocharger is arranged) of the ship engine with respect to the crank axis direction.

4 Claims, 8 Drawing Sheets

Figure 1:
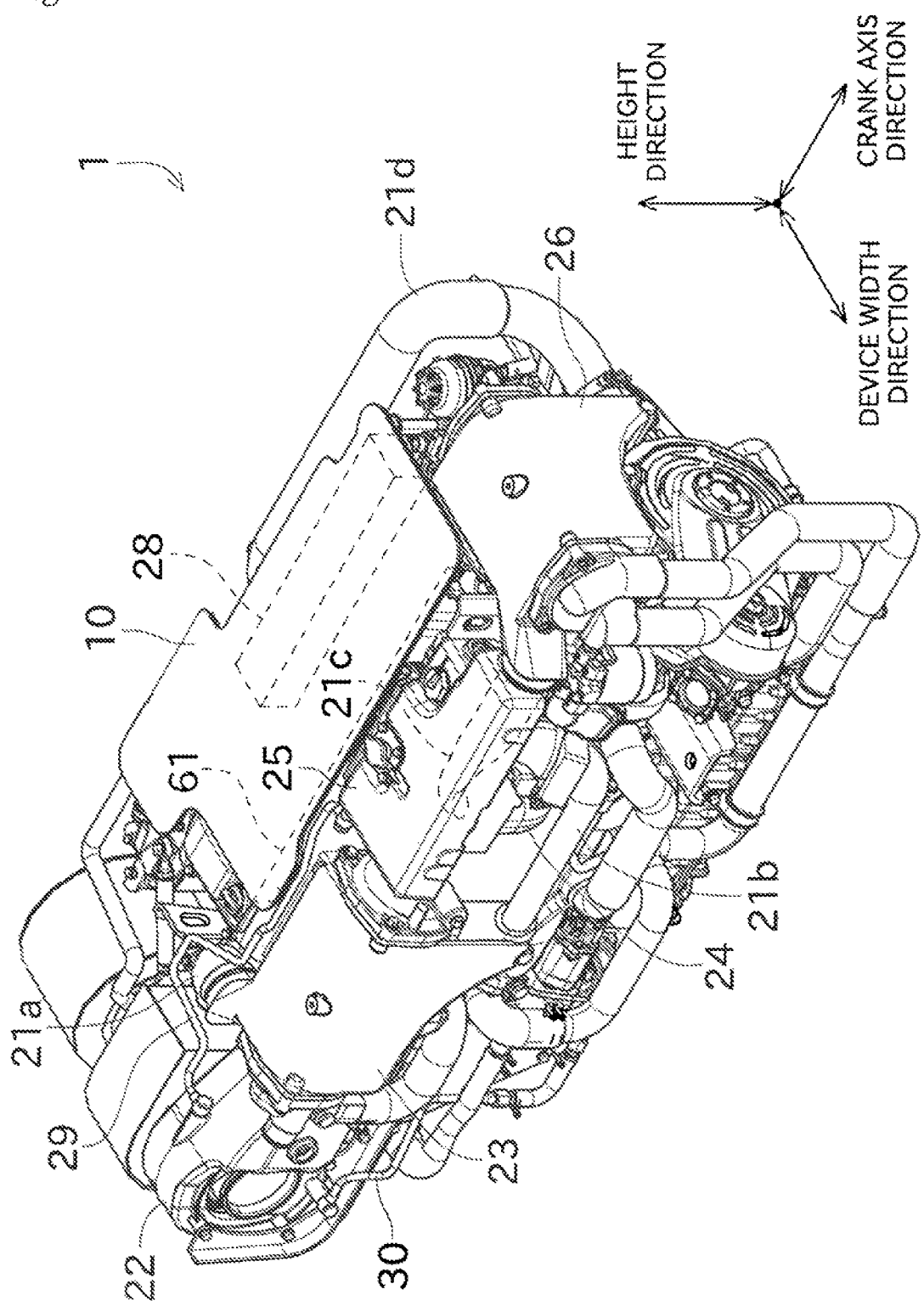

(51) Int. Cl.
 *F02B 37/00* (2006.01)
 *F02B 67/10* (2006.01)
 *F01D 25/12* (2006.01)

(52) U.S. Cl.
 CPC ............ *F02B 37/013* (2013.01); *F02B 67/10* (2013.01); *F05D 2260/211* (2013.01); *Y02T 10/144* (2013.01); *Y02T 10/146* (2013.01)

(58) Field of Classification Search
 CPC .... F02B 29/0406; F02B 29/045; F02B 33/34; F02B 33/44
 USPC ............... 123/562, 563, 559.1; 415/176–179
 See application file for complete search history.

(56) References Cited

FOREIGN PATENT DOCUMENTS

| | | |
|---|---|---|
| JP | 54-165609 | 11/1979 |
| JP | 59-86316 | 6/1984 |
| JP | 60-101223 A | 6/1985 |
| JP | 60120229 | 8/1985 |
| JP | 02-191814 A | 7/1990 |
| JP | 06-66146 A | 3/1994 |
| JP | 11-315725 | 11/1999 |
| JP | 2011-099332 | 5/2011 |
| JP | 2011-163201 | 8/2011 |

\* cited by examiner

SHIP ENGINE

BACKGROUND OF THE INVENTION

Field of the Invention

The present invention relates to a ship engine including two turbochargers and two intercoolers.

Background Art

A conventionally known configuration of an engine of a vehicle, a ship, or the like, is a configuration including two turbochargers (two-stage turbocharging system). The two-stage turbocharging system causes a turbine of one turbocharger to rotate by using an exhaust gas discharged from a cylinder, and thereby compresses air and sends the air to the cylinder side. The other turbocharger further compresses the air having been compressed by the one turbocharger, and then sends the air to the cylinder. As a result, the flow volume of air supplied to the cylinder can be increased, which leads to improvement in engine output.

Since the air compressed by the turbocharger has a high temperature, the density decreases (the mass flow rate decreases). This is why an intercooler for cooling high-temperature air is arranged after the turbocharger. Patent Documents 1 to 3 disclose two-stage turbocharging systems each including intercoolers (two intercoolers in total) that are arranged after one turbocharger and the other turbocharger, respectively. In the disclosures of the Patent Documents 1 to 3, an engine for use in construction equipment such as a power shovel, an engine for use in an automobile, an engine for use in an aircraft, and the like, are mentioned as objects to which the two-stage turbocharging system is applied.

Another known configuration of the two-style turbocharging system is a configuration including two turbochargers and one intercooler, in which it having passed sequentially through the two turbochargers is cooled by the one intercooler. The two-stage turbocharging system of this type is adopted in, for example, an engine (ship engine mounted to a ship.

PRIOR-ART DOCUMENTS

Patent Documents

Patent Document 1: Japanese Patent Application Laid-Open No. 2011-99332

Patent Document 2: Japanese Patent Application Laid-Open No. 2011-163201

Patent Document 3: Japanese Patent No. 3953636

BRIEF SUMMARY OF THE INVENTION

The two-stage turbocharging system of this type requires an intercooler with high cooling performance (that is with a large size) because a gas compressed by the two turbochargers is cooled by one intercooler. Therefore, adoption of such a two-stage turbocharging system makes it necessary that the size of the intercooler is considered in determination of the positions of other devices, which decreases the degree of freedom in the layout of the devices.

In addition, a ship engine requires that the following points be considered in determination of the layout. Since a ship may sometimes include a plurality of ship engines that are arranged in parallel, a layout that provides a reduced size with respect to the direction in which the plurality of ship engines are arranged in parallel is preferable for the ship engine. Moreover, the ship engine may be sometimes arranged in a lower region of a hull, and therefore an operator has to work on an upper surface of the ship engine when performing a maintenance operation or the like. Thus, a layout that allows the operator existing on the upper surface to easily perform the maintenance operation is preferable for the ship engine.

These points need to be considered hi determination of arrangement of the intercooler of the ship engine. In engines of construction equipment, automobiles, and the like, a turbocharger and an intercooler are generally arranged at some distance from a cylinder block, not close to the cylinder block. This makes the arrangement of the intercooler less problematic.

The present invention has been made in view of the circumstances described above, and a primary object of the present invention is to provide a ship engine with a reduced size with respect to the direction in which the ship engines are arranged in parallel, that enables facilitation of a maintenance operation while preventing a decrease in the degree of freedom in the layout.

Means for Solving the Problems and Effects Thereof

Problems to be solved by the present invention are as described above, and next, means for solving the problems and effects thereof will be described.

In an aspect of the present invention, a ship engine having the following configuration is provided. The ship engine includes a first turbocharger, a first intercooler, a second turbocharger, and a second intercooler. The first turbocharger supplies air by using an exhaust gas. The first intercooler into which a gas having passed through the first turbocharger flows cools the gas whose temperature has been elevated in the first turbocharger. The second turbocharger into which a gas having passed through the first intercooler flows supplies air by using an exhaust gas. The second intercooler into which a gas having passed through the second turbocharger flows cools the gas whose temperature has been elevated in the second turbocharger. In the ship engine, the first turbocharger is arranged in one end portion with respect to a crank axis direction, and the second intercooler is arranged in the other end portion with respect to the crank axis direction. The first intercooler and the second turbocharger are arranged side by side in the crank axis direction with the first intercooler located at the first turbocharger side.

Such a configuration can improve the degree of freedom in the layout of the ship engine, as compared with a configuration including a single intercooler. In addition, since the first turbocharger and the second intercooler are arranged in one and the other end portions of the ship engine with respect to the crank axis direction, the size can be limited with respect to the direction (device width direction) perpendicular to the crank axis direction. This allows effective use of a space of a ship in a case where, for example, a plurality of ship engines are arranged in parallel in the device width direction. Moreover, this configuration provides easy access to the turbochargers and the like as compared with a configuration in which the turbochargers and the like are stacked in the height direction of the engine. Therefore, facilitation of a maintenance operation is obtained.

Preferably, the ship engine is configured as follows. The ship engine includes a plate-like cover in the shape of a flat plate that covers a valve cover. When viewed in the thickness direction of the plate-like cover, the first turbocharger, the first intercooler, the second turbocharger, and the second intercooler are arranged at only three of four sides of the plate-like cover.

Such a configuration enables all operator to work on the plate-like cover (top cover) when performing a maintenance operation on the turbochargers and the like. This facilitates the operation, and also prevents damage to pipe arrangements or the like. Additionally, since the turbochargers and the like are arranged at only three of the four sides of the plate-like cover, the operator need not largely change his/her orientation in order to perform the maintenance operation on the plurality of turbochargers and the like. In this point as well, facilitation of the operation is obtained.

Preferably, the ship engine is configured as follows. An upper surface (of the ship engine) and a surface of the plate-like cover are at least partially identical. When the height of the position of a bisector bisecting the distance between the upper surface and a bottom surface of the ship engine that is a surface at the side opposite to the upper surface is defined as a reference height, all of the first turbocharger, the first intercooler, the second turbocharger, and the second intercooler are arranged higher than the reference height.

Since the turbochargers and the like are arranged in an upper region (near the plate-like cover) of the ship engine, further facilitation of the operation is obtained.

Preferably, the ship engine is configured as follows. The ship engine includes an intake manifold into which a gas having passed through the second intercooler flows. In the ship engine, a path of a gas extending from the first turbocharger to the first intercooler is shorter than a path of a gas extending from the first intercooler to the second turbocharger, and a path of a gas extending from the second turbocharger to the second intercooler is shorter than a path of a gas extending from the second intercooler to the intake manifold.

Accordingly, the length of the path through which the gas whose temperature has been elevated in the turbocharger flows can be relatively short. Consequently, parts of all the air supply pipes that need to be covered with a heat insulating material or the like can be shortened, which leads to cost reduction.

BRIEF DESCRIPTION OF THE DRAWINGS/FIGURES

FIG. 1 A perspective view of a ship engine according to an embodiment of the present invention.

Figure 2:
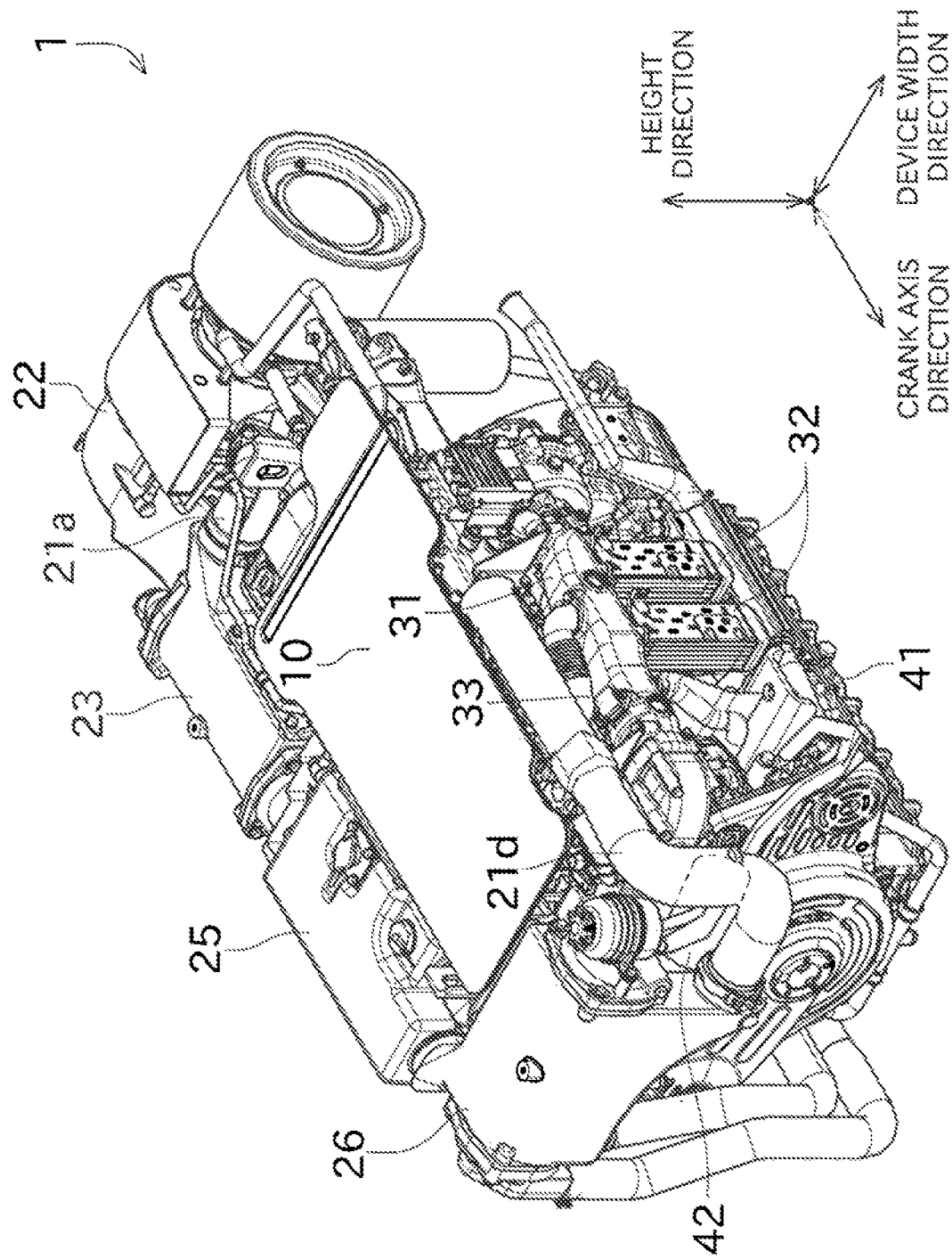

FIG. 2 A perspective view of the ship engine as viewed from another angle.

Figure 3:
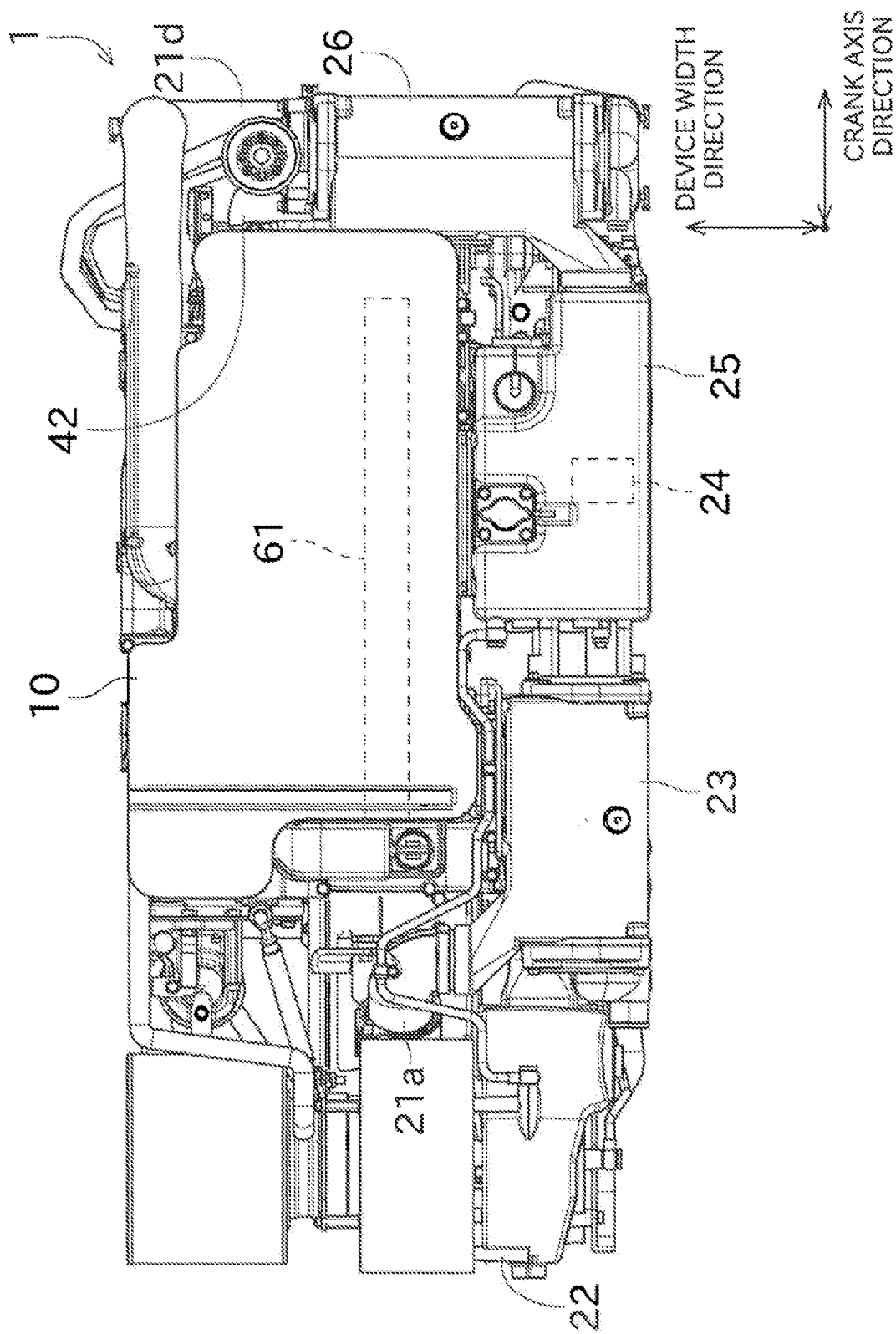

FIG. 3 A plan view of the ship engine.

Figure 4:
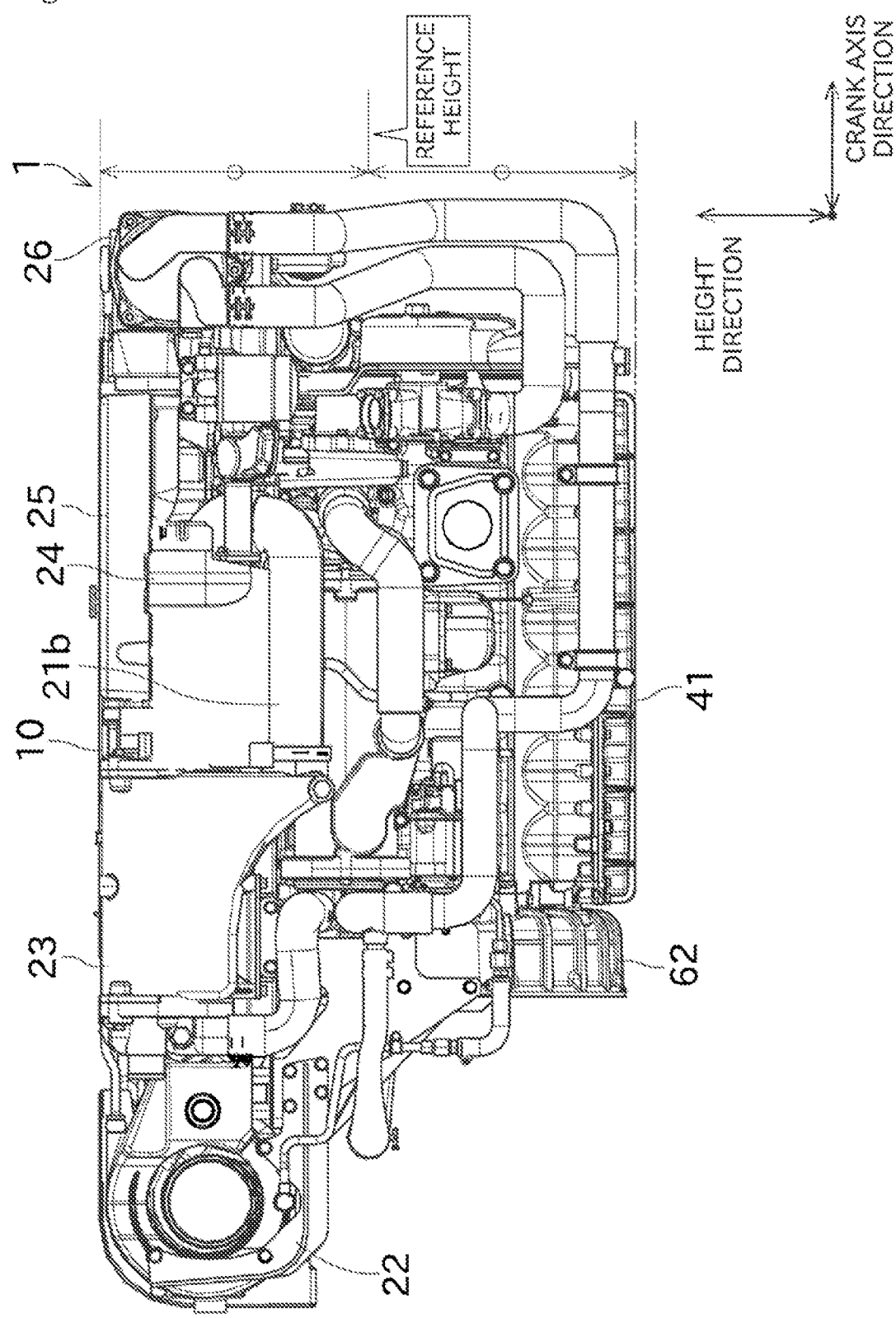

FIG. 4 A front elevational view of the ship engine.

Figure 5:
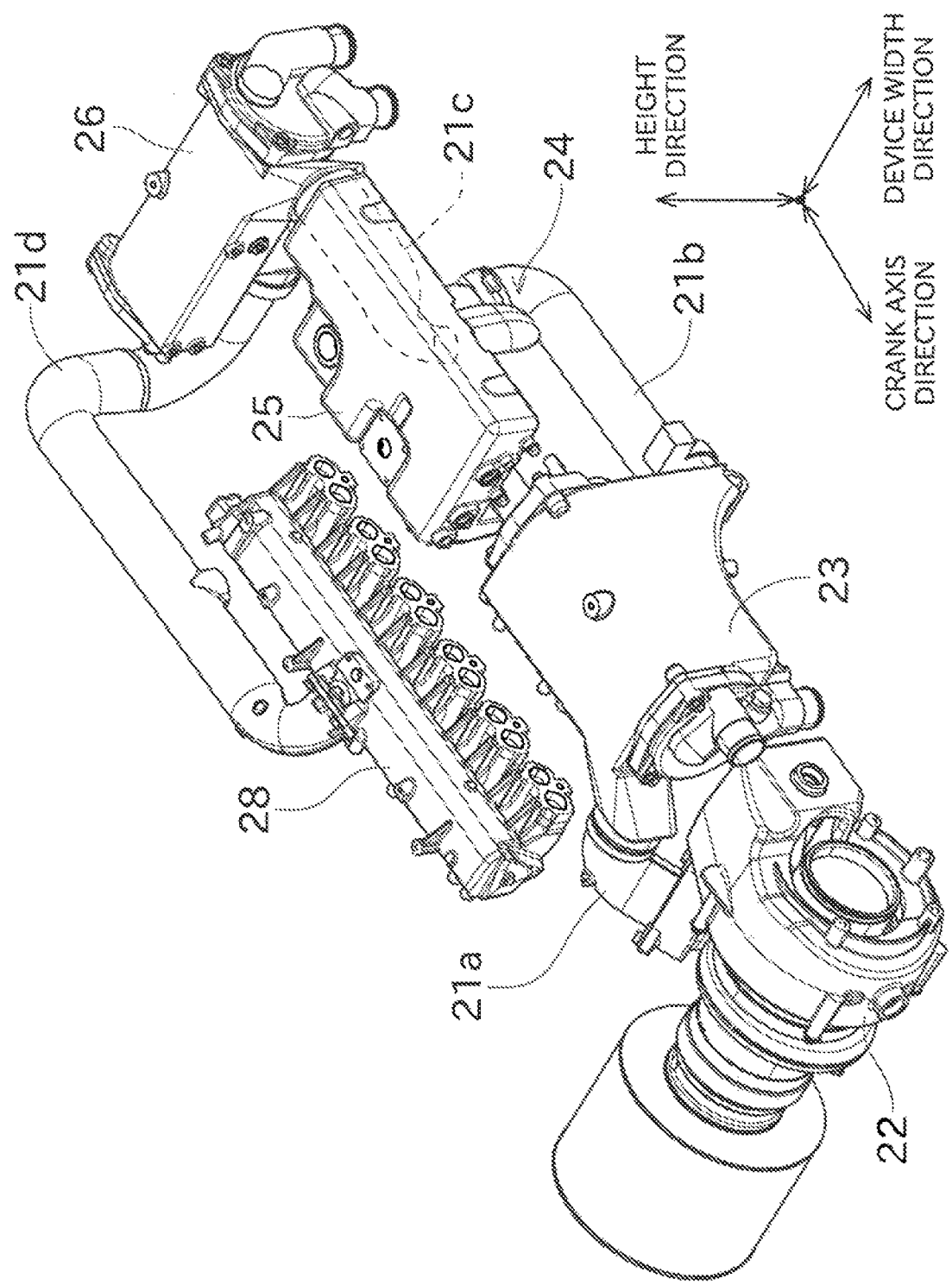

FIG. 5 A perspective view showing the positional relationship among devices of an air supply system.

Figure 6:
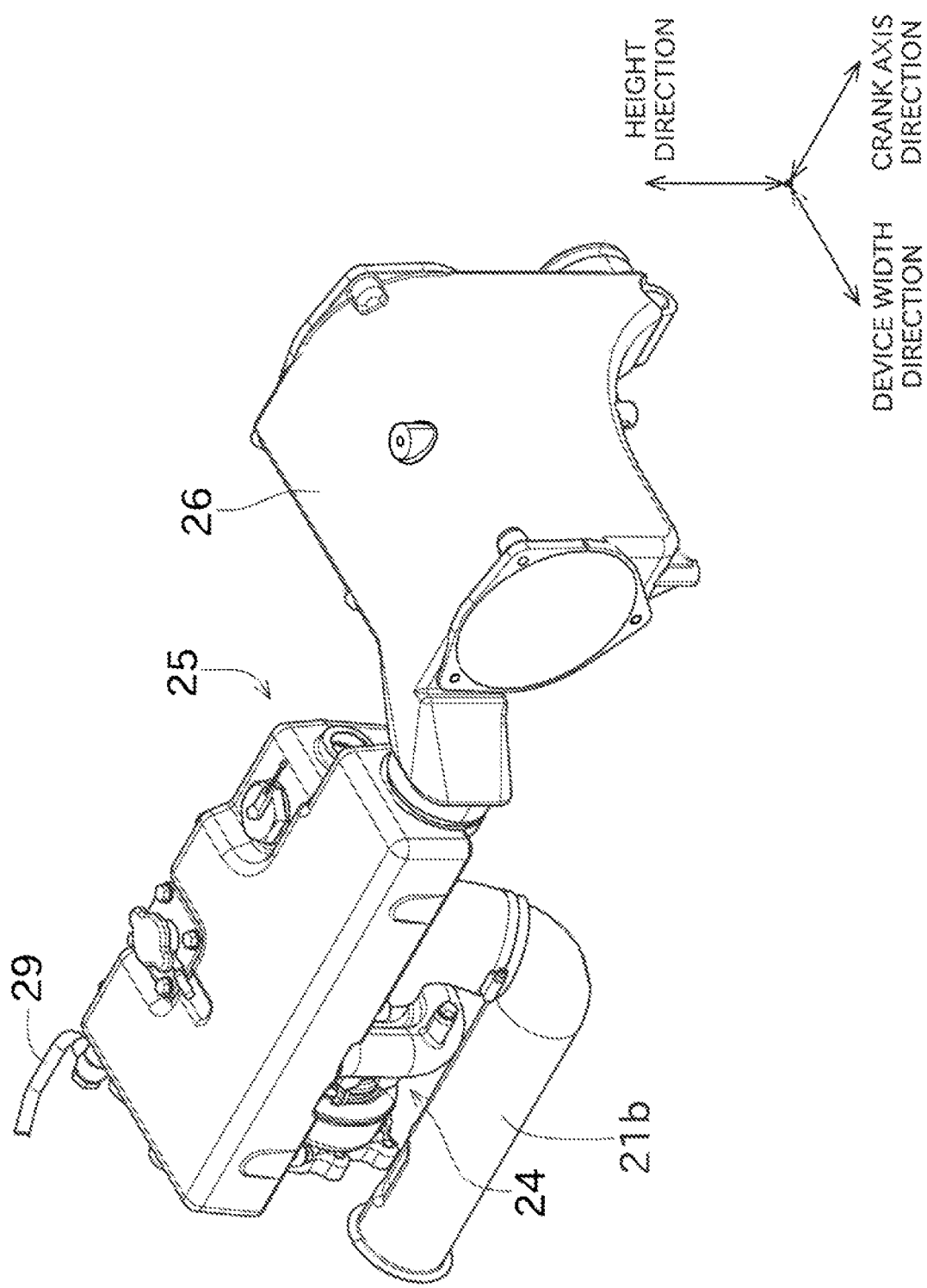

FIG. 6 A perspective view showing an expansion tank and therearound.

Figure 7:
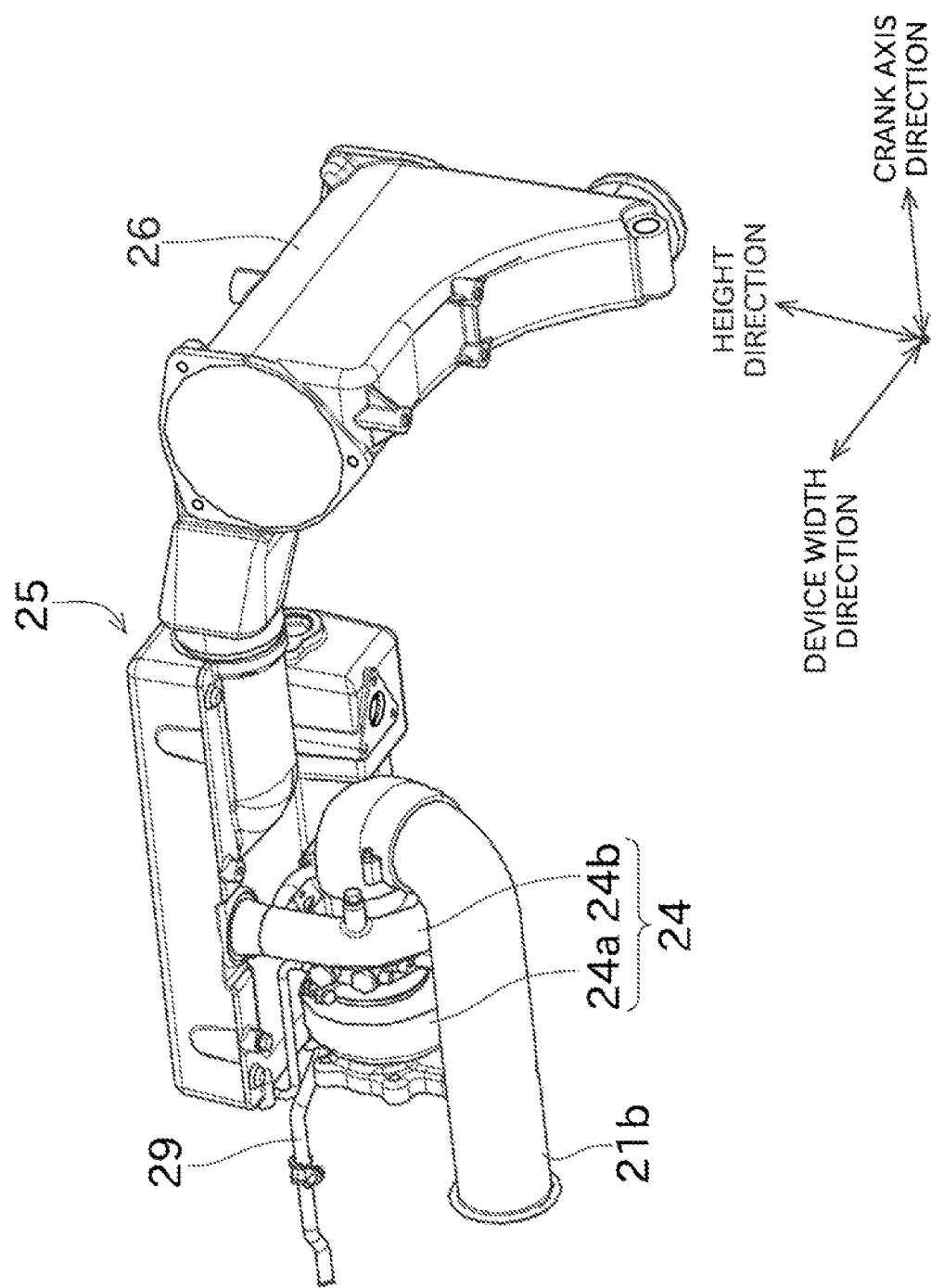

FIG. 7 A perspective view showing the expansion tank and therearound.

Figure 8:
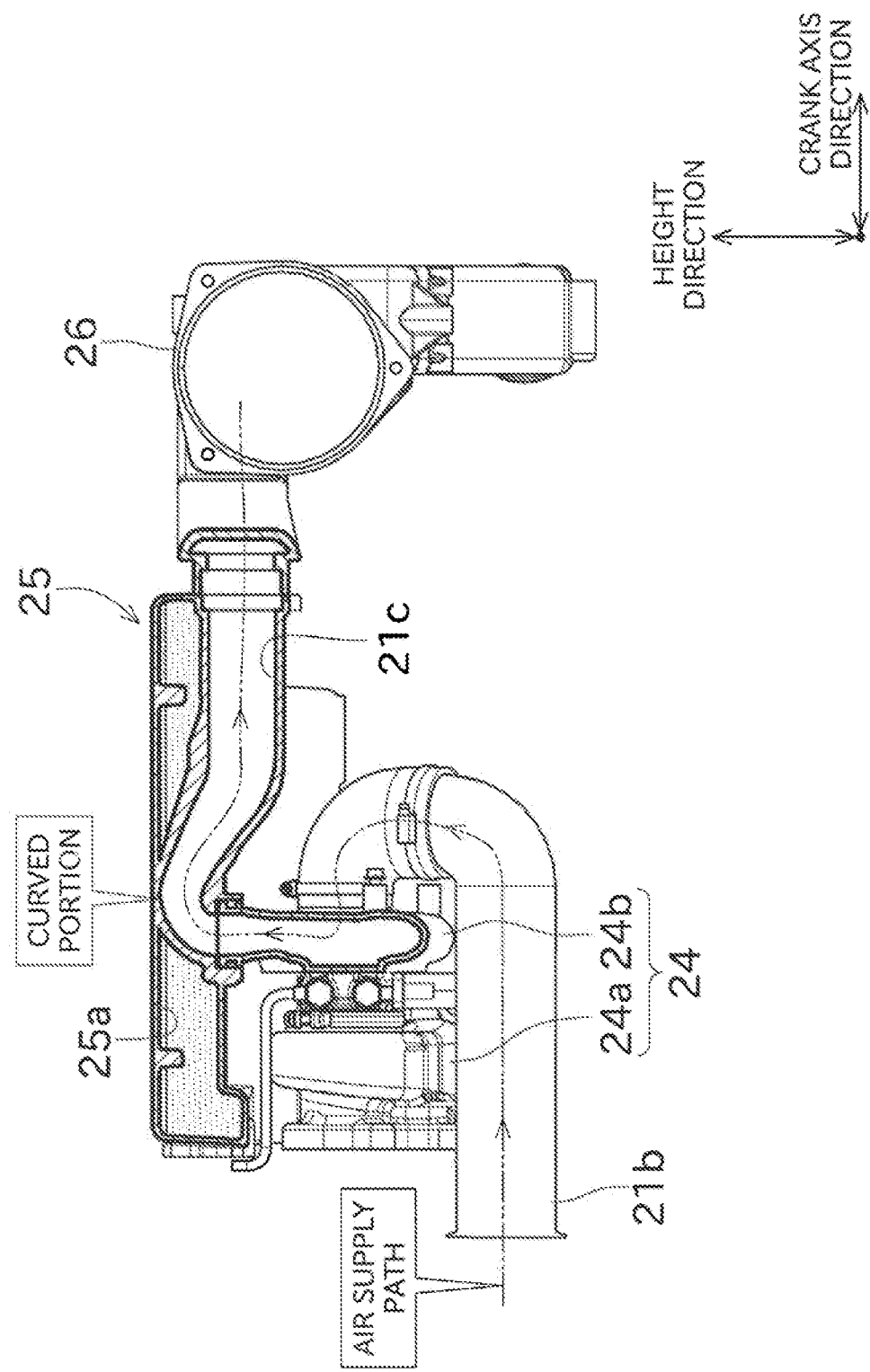

FIG. 8 A cross-sectional view showing an internal structure of the expansion tank.

DETAILED DESCRIPTION OF THE INVENTION

Embodiment for Carrying Out the Invention

Next, an embodiment of the present invention will be described with reference to the drawings. FIGS. 1 and 2 are perspective views of a ship engine 1. FIG. 3 is a plan view of the ship engine 1. FIG. 4 is a front elevational view of the ship engine 1. FIG. 5 is a perspective view showing the positional relationship among devices included in a two-stage turbocharging system. In the following description, the vertical direction of the ship engine 1 will be referred to as height direction, the longitudinal direction of a crankshaft 61 (see FIG. 3) of the ship engine 1 will be referred to as crank axis direction, and the direction perpendicular to both the height direction and the crank axis direction will be referred to as device width direction, as shown in FIG. 1. The top side of FIG. 1 with respect to the height direction is defined as the upper side.

The ship engine 1 of this embodiment is a diesel engine of in-board type that is mounted in a ship such as a pleasure boat. The ship engine 1 adopts a two-stage turbocharging system.

As shown in FIGS. 1, 2, and the like, the ship engine 1 includes a top cover (plate-like cover) 10. The top cover 10, which is in the shape of a flat plate, is arranged with its thickness direction being identical to the height direction. A valve cover, a cylinder block, and the like, are arranged below the top cover 10.

As shown in FIG. 1, etc., the two-stage turbocharging system of the ship engine 1 includes a first turbocharger 22, a first intercooler 23, a second turbocharger 24, a second intercooler 26, and air supply pipes 21a to 21d that connect them.

The first turbocharger 22 includes a turbine and a compressor provided in a housing. The turbine is configured to rotate by using an exhaust gas. The compressor is connected to a shaft to which the turbine is also connected, and configured to rotate along with rotation of the turbine. Rotation of the compressor enables the first turbocharger 22 to compress air and forcibly supply air. This configuration is able to, by using the exhaust gas, increase the flow volume of air supplied to a cylinder, and thus achieves an increased output of the ship engine 1. Air intake performed by the first turbocharger 22 causes rapid compression of air, which makes the temperature of the air high. This high-temperature air is sent out through the air supply pipe 21a to the first intercooler 23.

A plurality of cooling pipes through which sea water flows are arranged within a housing of the first intercooler 23. The air sent out from the first turbocharger 22 flows around the cooling pipes. Such a configuration enables the first intercooler 23 to cool the air sent out from the first turbocharger 22 by means of heat exchange between the air and the sea water. The air cooled by the first intercooler 23 is sent out through the air supply pipe 21b to the second turbocharger 24.

The second turbocharger 24, whose configuration is equivalent to the configuration of the first turbocharger 22, compresses the air sent out from the first intercooler 23 by using an exhaust gas. The compressed air has a high temperature, similarly to the above-described case. Such air having the high temperature is sent out to the air supply pipe (air supply path, cooling path) 21c provided in an expansion tank (cooling water tank) 25.

The expansion tank 25 pools fresh water (cooling water) for cooling purpose. The cooling water is used for cooling various parts of the ship engine 1. For example, the cooling water pooled in the expansion tank 25 is sent through a pump, a cylinder block, and a cooling pipe 30 to the first turbocharger 22 and the like, to cool the first turbocharger 22 and the like. The cooling water is recovered into the expansion tank 25 through a cooling pipe 29. The expansion tank 25 also serves to absorb a change in the volume of the cooling water caused by, for example, a temperature rise of the cooling water.

The expansion tank 25 of this embodiment is provided therein with the air supply pipe 21c. The air supply pipe 21c connects the second turbocharger 24 to the second intercooler 26. Since the cooling, water is pooled around the air supply pipe 21c, the expansion tank 25 is able to cool a gas passing through the air supply pipe 21c. Details of the air supply pipe 21c will be described later.

The second intercooler 26, whose configuration is equivalent to the configuration of the first intercooler 23, cools the air sent out from the second turbocharger 24 by means of heat exchange between the air and sea water. The air cooled by the second intercooler 26 is sent out through the air supply pipe 21d to an intake manifold 28.

A common rail, a fuel injection system, a cylinder, and the like, are arranged in a cylinder head provided inside the top cover 10. In the ship engine 1, supplied compressed air is further compressed in the cylinder and then a fuel is injected, so that a piston is moved up and down to generate motive power. The motive power thus generated is transmitted to a propulsion unit or the like through the crankshaft 61 shown in FIG. 3.

In this embodiment, a flywheel housing 62 (FIG. 4) is arranged in an end portion of the crankshaft 61 at the first turbocharger 22 side. A clutch (not shown) is coupled to a flywheel provided in the flywheel Lousing 62. Thus, transmission of the output of the ship engine 1 to the propulsion unit or the like and blocking of the transmission are enabled.

An exhaust gas exhausted from the cylinder is entirely or partially sent out to the first turbocharger 22 and the second turbocharger 24 through an exhaust manifold, an exhaust pipe, and the like. The exhaust gas is used to rotate the turbine, as mentioned above.

In addition, the exhaust gas is also sent out to an EGR pipe 31 shown in FIG. 2 through the exhaust pipe and the like. The EGR pipe 31 is connected to the air supply pipe 21d. This configuration allows the exhaust gas to be partially supplied to the cylinder again, to reduce nitrogen oxides in the exhaust as and to improve fuel efficiency.

EGR coolers 32 and an EGR sensor 33 are arranged near the EGR pipe 31. The EGR coolers 32 cool air that is sent out through the EGR pipe 31 to the air supply side by means of heat exchange between the air and fresh water. The EGR sensor 33 measures the amount of exhaust gas that has been sent out through the EGR pipe 31 to the air supply side.

In this embodiment, the EGR pipe 31, the EGR coolers 32, and the EGR sensor 33 are arranged below the air supply pipe 21d and in an end portion at the side opposite to the side where the first intercooler 23, the second turbocharger 24, and the like, are arranged with respect to the device width direction. The EGR pipe 31 and the like are arranged outer than the intake manifold 28.

The ship engine 1 includes an oil pan 41 arranged on its surface (bottom surface) opposite to the top cover 10 with respect to the height direction. The oil pan 41 is a member for storage of an engine oil that is to be supplied to the inside of the engine (for example, to the cylinder, the crankshaft 61, and the like). The engine oil reserved in the oil pan 41 is sent out to the inside of the engine by means of an oil pump.

The engine oil sent out by the oil pump passes through an oil filter 42 shown in FIG. 2. As a result, metal powder, foreign substances, and the like, contained in the engine oil can be removed. The engine oil is used not only to give lubrication and air-tightness to the inside of the engine but also to cool the interior of the engine. Therefore, in order to ensure effective cooling of the interior of the engine, the ship engine 1 includes an oil cooler (not shown) for cooling the engine oil. The oil cooler is configured to cool the engine oil by means of heat exchange between the engine oil and sea water, fresh water, or the like.

In this embodiment, the oil filter 42 is arranged below the second intercooler 26 and near an end portion of the ship engine 1 with respect to the crank axis direction. The oil filter 42 is, at least in a plan view, arranged inner (closer to the crankshaft 61) than the air supply pipe 21d. Therefore, the oil filter 42 is protected from the outside. The oil cooler (not shown) is arranged inner (closer to the crankshaft 61) than the EGR cooler 32.

Next, arrangement of devices included in the two-stage turbocharging system of this embodiment will be described from various viewpoints. In the following description, the devices (the first turbocharger 22, the first intercooler 23, the second turbocharger 24, and the second intercooler 26) included in the two-stage turbocharging system may be collectively referred to as "turbochargers and the like".

Firstly, arrangement of the turbochargers and the like in a plan view will be described with reference to a plan view (FIG. 3). Since the thickness direction of the top cover 10 is identical to the height direction, a plan view of this embodiment can be also considered as "a view in the thickness direction of the top cover 10".

The first turbocharger 22 is arranged in one end portion of the ship engine 1 with respect to the crank axis direction. The first intercooler 23 and the second turbocharger 24 are arranged in one end portion of the ship engine 1 with respect to the device width Direction. The first intercooler 23 and the second turbocharger 24 are arranged side by side in the crank axis direction with the first intercooler 23 located closer to the first turbocharger 22. The second intercooler 26 is arranged in the other end portion of the ship engine 1 with respect to the crank axis direction.

Accordingly, in this embodiment, the turbochargers and the like are arranged so as to form a side surface of the ship engine 1. In other words, the turbochargers and the like are arranged so as to surround (more specifically, surround three of the four sides of) the top cover 10 in a plan view. This can limit the size of the ship engine 1 with respect to the device width direction.

The intake manifold 28 is arranged in the other end portion (at the side opposite to the side where the first intercooler 23 and the like are located) of the ship engine 1 with respect to the device width direction. The expansion tank 25 is arranged next to the first intercooler 23 with respect to the crank axis direction, and also arranged so as to overlap the second turbocharger 24 in a plan view.

Next, the positions of the turbochargers and the like with respect to the height direction will be described with reference to a side view (FIG. 4). In this embodiment, an upper surface of the top cover 10 constitutes a part of an upper surface of the ship engine 1. A lower surface of the oil pan 41 constitutes a part of a lower surface of the ship engine 1. Accordingly, the distance from the lower surface of the oil pan 41 to the upper surface of the top cover 10 can be considered as the height of the ship engine 1. In the following, half the height of the ship engine 1 will be defined as "reference height", as shown in FIG. 4.

The turbochargers and the like are arranged higher (closer to the top cover 10) than the reference height. To be more specific, not only the upper ends of the turbochargers and the like but also central portions and the lower ends thereof are arranged higher than the reference height. The first turbocharger 22, the first intercooler 23, and the second turbocharger 24 are arranged with their upper ends being substantially identical to the upper end of the ship engine 1.

Such a configuration in which the turbochargers and the like are arranged in an upper region of the ship engine 1 achieves a layout that allows an operator who is working on the top cover 10 in performing a maintenance operation to easy access the turbochargers and the like (the operation is facilitated).

The expansion tank 25 and the intake manifold 28 are also arranged higher than the reference height. Particularly, the expansion tank 25 is arranged with its upper surface being substantially identical to the upper surface of the ship engine 1.

Next, comparison among the lengths of the air supply pipes 21a to 21d will be given with reference to a perspective view showing the positional relationship among the devices of the air supply system (FIG. 5).

Here, the length of the air supply pipe 21a means the length of a path of air extending from the first turbocharger 22 to the first intercooler 23. The same applies to the other air supply pipes. Therefore, in this embodiment, comparison among the lengths of paths of air supplied to the cylinder can be given based on comparison among the lengths of the air supply pipes.

In this embodiment, the condition that "the length of the air supply pipe 21a<the length of the air supply pipe 21b" is established, and the condition that "the length of the air supply pipe 21c<the length of the air supply pipe 21d" is established.

This configuration enables the air supply pipe 21a and the air supply pipe 21c, through which high-temperature air passes, to be relatively short. Accordingly, parts of all the air supply pipes that need to be covered with a heat insulating material or the like can be shortened, which leads to cost reduction.

As thus far described, the ship engine 1 of this embodiment includes the first turbocharger 22, the first intercooler 23, the second turbocharger 24, and the second intercooler 26. The first turbocharger 22 supplies air by using an exhaust gas. The first intercooler 23, into which a gas (air) having passed through the first turbocharger 22 flows, cools the gas whose temperature has been elevated in the first turbocharger 22. The second turbocharger 24, into which the gas having passed through the first intercooler 23 flows, supplies air by using an exhaust gas. The second intercooler 26, into which the gas having passed through the second turbocharger 24 flows, cools the gas whose temperature has been elevated in the second turbocharger 24. In the ship engine 1, the first turbocharger 22 is arranged in one end portion with respect to the crank axis direction, and the second intercooler 26 is arranged in the other end portion with respect to the crank axis direction. The first intercooler 23 and the second turbocharger 24 are arranged side by side in the crank axis direction with the first intercooler 23 located at the first turbocharger 22 side.

Such a configuration in which the first turbocharger 22 and the second intercooler 26 are arranged in one and the other end portions of the ship engine 1 with respect to the crank axis direction is able to limit the size with respect to the device width direction. This allows effective use of a space of a ship in a case where, for example, a plurality of ship engines 1 are arranged in parallel in the device width direction. Additionally, this embodiment provides easy access to the turbochargers and the like as compared with a configuration in which the turbochargers and the like are stacked in the height direction. Therefore, facilitation of the maintenance operation is obtained.

Next, the second turbocharger 24 and the expansion tank 25, and particularly the air supply pipe 21c provided in the expansion tank 25, will be described with reference to FIGS. 6 to 8. FIGS. 6 and 7 are perspective views showing the expansion tank 25 and therearound. FIG. 8 is a cross-sectional view showing an internal structure of the expansion tank 25.

As shown in FIGS. 7 and 8, the second turbocharger 24 includes a turbine housing 24a and a compressor housing 24b. The turbine is arranged in the turbine housing 24a. The compressor is arranged in the compressor housing 24b.

The air supply pipe 21b connected to the first intercooler 23, which extends in the crank axis direction and curves into a U-like shape, is connected to the compressor housing 24b. As shown in FIGS. 7 and 8, the compressor housing 24b includes a pipe-shaped portion that extends in the height direction. The pipe-shaped portion connects the second turbocharger 24 directly to the expansion tank 25 (the air supply pipe 21c) (without interposition of any other pipe or the like therebetween).

As shown in FIG. 8, the air supply pipe 21c includes a portion extending in the height direction, a portion extending in the crank axis direction, and a curved portion (curved portion) provided therebetween. In this embodiment, the air supply pipe 21c has a circular cross-section with its diameter being smaller in the portion extending in the height direction than in the portion extending in the crank axis direction. In other words, the diameter of the air supply pipe 21c increases toward the downstream side. The air supply pipe 21c is provided with its lower portion being exposed to the outside and its upper portion being positioned within the expansion tank 25.

The expansion tank 25 contains therein the air supply pipe 21c and also includes a tank unit 25a that pools cooling water. The tank unit 25a is arranged above the air supply pipe 21c. Therefore, a portion constituting the upper side of the air supply pipe 21c and a portion constituting the lower side (bottom side) of the tank unit 25a are common in part. This configuration is able to cool a gas flowing through the air supply pipe 21c by means of heat exchange between the gas and the cooling water. The cooled gas is sent out to the second intercooler 26, as mentioned above.

As thus far described, the ship engine 1 of this embodiment includes the second turbocharger 24 and the expansion tank 25. The second turbocharger 24 supplies air by using an exhaust gas. The expansion tank 25 includes the tank unit 25a that pools cooling water and absorbs a volume change caused by a temperature rise of the cooling water. In the expansion tank 25, the air supply pipe 21e is provided that allows the gas sent out from the second turbocharger 24 to pass therethrough and cools the gas by means of heat exchange between the gas and the cooling water contained in the tank unit 25a.

This enables the expansion tank 25 to exert not only a function for adjusting the amount of cooling water but also a function for cooling the gas having passed through the second turbocharger 24. As a result, the second intercooler 26 for cooling the gas having passed through the second turbocharger 24 can be downsized, to achieve size reduction of the ship engine 1.

The ship engine 1 of this embodiment includes the second intercooler 26 that cools the gas having passed through the second turbocharger 24. The gas having passed through the second turbocharger 24 flows through the air supply pipe 21c of the expansion tank 25, and then passes through the second intercooler 26.

Accordingly, the temperature of the gas having passed through the second turbocharger 24 can be further lowered. Since the gas sent out to the second intercooler 26 has been already cooled by the expansion tank 25, sufficient lowering of the temperature of the gas is obtained.

In the ship engine 1 of this embodiment, the air supply pipe 21c of the expansion tank 25 curves.

Accordingly, the length of the air supply pipe 21c can be increased without any change in the size of the expansion tank 25. Therefore, the cooling performance can be improved. Moreover, an entrance and an exit of the cooling path need not be connected in a linear fashion, which allows improvement in the degree of freedom in the positions of the entrance and exit. As a result, the degree of freedom in the arrangement of the second turbocharger 24 and the second intercooler 26 is improved.

In the ship engine 1 of this embodiment, the second turbocharger 24 includes the compressor housing 24b that covers the compressor. The compressor housing 24b and the expansion tank 25 are directly coupled to each other without interposition of any air supply pipe.

Accordingly, a high-temperature gas having passed through the second turbocharger 24 can be cooled promptly. Therefore, a situation where an alt supply pipe having a high temperature is exposed to the outside does not occur, and thus there is no need to cover an air supply pipe with a beat insulating material or the like. As a result, reduction in the number of parts and simplification of an assembling process are achieved.

Although a preferred embodiment of the present invention has been described above, the above-described configuration can be modified, for example, as follows.

The layout described above is one illustrative example, and the layout can be modified as appropriate. For example, the positions of the expansion tank 25, the EGR pipe 31, the oil filter 42, and the like, may be changed in accordance with, for example, a required size or specifications.

The shapes of the air supply pipes 21a to 21d that connect the turbochargers and the like to one another are not limited to the above-described ones, and may be changed as appropriate in accordance with, for example, the position of another device.

The shape of the air supply pipe 21c is not limited to curved one as shown in the above-described embodiment. For example, it may be a linear shape. It is not always necessary that the diameter of the air supply pipe 21c increases toward the downstream. The diameter may decrease toward the downstream, or alternatively the diameter may be constant. Although the above-described embodiment illustrates the configuration in which only the upper side of the air supply pipe 21c is in contact with the cooling water, it may be acceptable that the cooling water is pooled so as to surround the air supply pipe 21c.

Direct connection between the second turbocharger 24 and the expansion tank 25 is not essential, and they may be connected to each other with interposition of an air supply pipe or the like.

The present invention is applicable to either of main equipment and auxiliary equipment as long as it is a ship engine.

DESCRIPTION OF THE REFERENCE NUMERALS 1 ship engine
10 top cover (plate-like cover)
21a-21d air supply pipe
22 first turbocharger
23 first intercooler
24 second turbocharger
25 expansion tank
26 second intercooler
28 intake manifold
61 crankshaft

What is claimed is:

1. A ship engine comprising:
   a first turbocharger that supplies air by using an exhaust gas;
   a first intercooler into which a gas having passed through the first turbocharger flows, the first intercooler being configured to cool the gas whose temperature has been elevated in the first turbocharger;
   a second turbocharger into which the gas having passed through the first intercooler flows, the second turbocharger being configured to supply air by using an exhaust gas;
   a second intercooler into which the gas having passed through the second turbocharger flows, the second intercooler being configured to cool the gas whose temperature has been elevated in the second turbocharger; and
   a crankshaft, wherein a longitudinal direction of the crankshaft defines a crank axis direction,
   the first turbocharger being arranged proximate a first end portion of the ship engine with respect to a crank axis direction, the second intercooler being arranged proximate a second end portion of the ship engine with respect to the crank axis direction, each of the first turbocharger and second intercooler being arranged along a width direction perpendicular to a height direction of the ship engine and perpendicular to the crank axis direction,
   the first intercooler and the second turbocharger being arranged proximate a side end portion of the engine with respect to the width direction and side by side in the crank axis direction with the first intercooler located closer to the first turbocharger than to the second turbocharger.

2. The ship engine according to claim 1, comprising a cover in the shape of a flat plate that covers a valve cover, wherein
   when viewed in a top view cover, the first turbocharger, the first intercooler, the second turbocharger, and the second intercooler are arranged at only three of four sides of the cover.

3. The ship engine according to claim 2, wherein
   an upper surface of the ship engine and a surface of the cover are identical,
   when a height of the position of a bisector bisecting the distance between the upper surface and a bottom surface of the ship engine that is a surface at the side opposite to the upper surface is defined as a reference height, all of the first turbocharger, the first intercooler, the second turbocharger, and the second intercooler are arranged higher than the reference height.

4. The ship engine according to claim 1, comprising an intake manifold into which a gas having passed through the second intercooler flows, wherein
   a path of the gas extending from the first turbocharger to the first intercooler is shorter than a path of the gas extending from the first intercooler to the second turbocharger, and a path of the gas extending from the second turbocharger to the second intercooler is shorter than a path of the gas extending from the second intercooler to the intake manifold.

* * * * *

UNITED STATES PATENT AND TRADEMARK OFFICE
CERTIFICATE OF CORRECTION

PATENT NO. : 9,777,619 B2
APPLICATION NO. : 14/373333
DATED : October 3, 2017
INVENTOR(S) : Hibino et al.

Page 1 of 1

It is certified that error appears in the above-identified patent and that said Letters Patent is hereby corrected as shown below:

In the Claims

In Column 10, Line 46, Claim 2, delete "view cover," and insert -- view of the cover, --.

Signed and Sealed this
Twenty-eighth Day of May, 2019

Andrei Iancu
*Director of the United States Patent and Trademark Office*